Patented Oct. 8, 1929

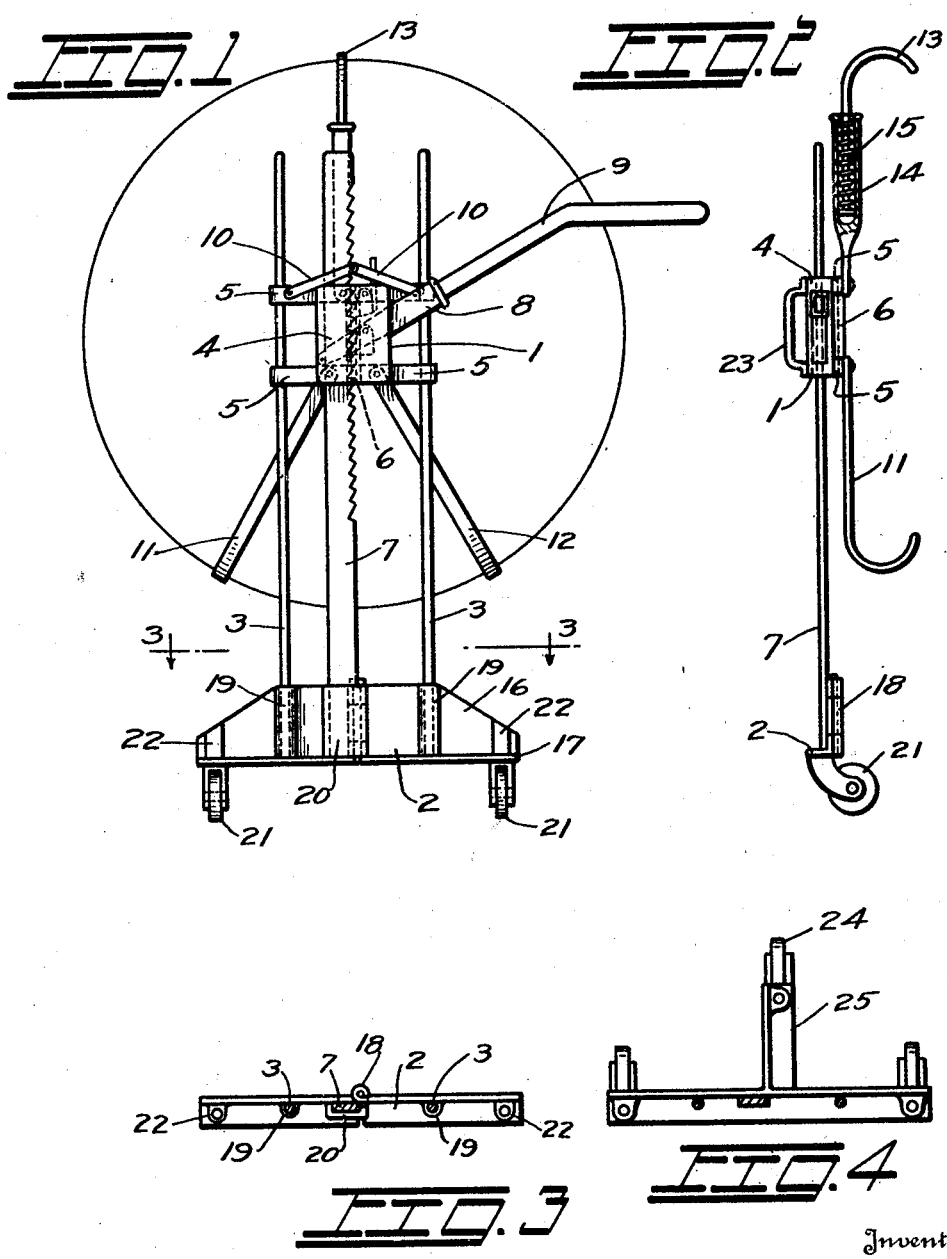

1,731,204

UNITED STATES PATENT OFFICE

LEONARD G. RECCHIA, OF SEATTLE, WASHINGTON

TIRE CARRIER

Application filed February 1, 1927. Serial No. 165,073.

The invention is a device for picking up and conveying a spare tire of a motor vehicle from a rack to a wheel and also from a wheel back to the rack.

The object of the invention is to provide a device for conveying the spare tire without soiling the hands.

Another object of the invention is to provide a device for taking hold of a tire which may also be used to convey it and hold it against the wheel or in any suitable position.

A further object of the invention is to provide a device for holding and conveying spare tires which is readily adjustable to tires of different sizes.

A still further object of the invention is to provide a device for holding and conveying tires of motor vehicles which is readily collapsible.

And a still further object of the invention is to provide a device for holding and conveying motor vehicle tires which is of a simple and economical construction.

With these ends in view the invention embodies, a frame having extending arms with hooks at their outer ends, a base having wheels thereon and vertical posts for slidably supporting the said frame.

Other features and advantages of the invention will appear from the following description, taken in connection with the drawings, wherein:

Figure 1 is a view showing the device as it would appear in use.

Figure 2 is a side view of the device with parts omitted.

Figure 3 is a sectional plan on line 3—3 of Figure 1.

Figure 4 is a view similar to that shown in Figure 3 showing a rigid instead of a collapsible base.

In the drawings the device is shown as it would be made wherein numeral 1 indicates the frame, numeral 2 the base and numeral 3 the vertical posts.

The frame 1 is made with a casing 4 having arms 5 hinged to the central portion thereof upon a hinge 6. At the outer ends of the arms are sleeves through which the posts 3 pass. The interior of the casing 4 is similar to that of any suitable lifting jack in which a bar, as indicated by the numeral 7 and having teeth in one side passes, and from the side of which projects an arm 8 which may be operated by a lever 9 to raise or lower the frame 1. The arms 5 may be folded about the hinge 6 so that the frame will not take up excessive room. The arms 5 may also be provided with pivoted links 10 to limit their outward movement and to hold them in position. Hooks 11 and 12 are pivotally connected to the lower arms 5 and a vertical hook 13 is attached to one of the upper of the arms 5 through a casing 14 having a spring 15 therein for resiliently holding the hook 13 in them. It will be observed that the hooks 11 and 12 may be opened to the position shown in Figure 1 and the hook 13 raised until it is placed over a tire so that the tire may be resiliently held between these members.

The base 2 is made as shown with a flat piece of material 16 having an outwardly extending flange 17 and being provided with a hinge 18 at the center so that it may readily be folded. The vertical members 3 are removably held in sockets 19 in the base and the bar 7 is removably held in a socket 20, as shown. At the outer ends of the base 2 are casters 21 which are pivotally mounted in bearings 22 in the base so that they will be free to rotate to adjust themselves to any suitable position.

The frame 1 may be provided with a handle 23 as shown in Figure 2 by which it may readily be gripped by the left hand while the lever 9 is operated by the right hand to raise or lower the frame 1 to place the tire in any suitable position. The use of the handle 23 is optional and it may be omitted as shown in Figure 1 if desired. It will be observed that the jack which is disclosed and described as being embodied in the frame 1 may be of any suitable design or arrangement and may be operated by any suitable means.

The device may also be made with a rigid frame instead of a collapsible frame as shown in Figure 4, for use in garages or the like. In this design a third roller 24 is provided which is mounted on an arm 25 to hold the device in the vertical position. The construction may otherwise be the same as hereinbefore described.

It will be understood that other changes may be made in the construction without departing from the spirit of the invention, one of which changes may be in the design or arrangement of the frame, another may be in the use of other means for gripping the tire and still another may be in the use of other means for supporting and operating the frame or tire gripping members.

The construction will be readily understood from the foregoing description. In use the device may be readily assembled as shown in Figure 1 and adjusted to such a position that the arms 11, 12 and 13 may be placed over the spare tire and when the tire is gripped the entire device may be moved away with the tire and the tire thereby conveyed to such a position that it may readily be placed upon a wheel. The old tire may then be gripped by the device and placed in the former position of the spare tire.

Having thus fully described my invention, what I claim as new and desire to secure by Letters Patent, is:

1. In a device for holding motor vehicle tires, vertical standards, a casing on the said standards, means within the said casing for raising or lowering it upon the said standards, arms pivotally attached to the said casing, hooks at the outer ends of the arms and resilient means for attaching one of the hooks to the said arms.

2. In a device for holding motor vehicle tires, vertical standards, a casing on the said standards, means within the said casing for raising or lowering it upon the said standards and arms pivotally attached to the said casing.

3. In a device for holding motor vehicle tires, vertical standards, a casing on the said standards, means within the said casing for raising or lowering it upon the said standards, arms pivotally attached to the said casing and rollers at the base of the said standards.

In testimony whereof I affix my signature.

LEONARD G. RECCHIA.